(12) United States Patent
Reyes

(10) Patent No.: US 9,863,749 B2
(45) Date of Patent: Jan. 9, 2018

(54) TAPE MEASURE MARKING ATTACHMENT

(71) Applicant: Luis Reyes, Mammoth Lakes, CA (US)

(72) Inventor: Luis Reyes, Mammoth Lakes, CA (US)

( * ) Notice: Subject to any disclaimer, the term of this patent is extended or adjusted under 35 U.S.C. 154(b) by 106 days.

(21) Appl. No.: 15/011,273

(22) Filed: Jan. 29, 2016

(65) Prior Publication Data

US 2016/0223311 A1 Aug. 4, 2016

Related U.S. Application Data

(60) Provisional application No. 62/109,563, filed on Jan. 29, 2015.

(51) Int. Cl.
*G01B 3/10* (2006.01)

(52) U.S. Cl.
CPC .... *G01B 3/1084* (2013.01); *G01B 2003/1089* (2013.01)

(58) Field of Classification Search
CPC ................ G01B 3/1084; G01B 2003/1089
USPC ........................................ 33/770, 759, 668
See application file for complete search history.

(56) References Cited

U.S. PATENT DOCUMENTS

| | | | | |
|---|---|---|---|---|
| 1,988,095 A | * | 1/1935 | Stockman | G01B 3/1061 |
| | | | | 33/27.03 |
| 2,349,670 A | * | 5/1944 | Moxey | B43L 9/045 |
| | | | | 33/27.03 |
| 3,192,630 A | | 7/1965 | Dineson | |
| 4,103,426 A | * | 8/1978 | Robin | B43L 9/045 |
| | | | | 33/27.03 |
| 4,507,869 A | * | 4/1985 | Stude | B25H 7/04 |
| | | | | 33/42 |
| 5,435,074 A | | 7/1995 | Holevas et al. | |
| 5,542,184 A | * | 8/1996 | Beard | B26B 29/06 |
| | | | | 30/293 |
| 5,815,939 A | | 10/1998 | Ruffer | |
| 6,763,603 B2 | * | 7/2004 | Carrabino | B25H 7/04 |
| | | | | 33/668 |
| 6,804,898 B1 | | 10/2004 | Hsu | |
| 6,931,734 B2 | * | 8/2005 | Elder | G01B 3/1071 |
| | | | | 33/42 |
| 6,935,045 B2 | | 8/2005 | Cubbedge | |
| 7,159,332 B2 | | 1/2007 | Sullivan | |
| 7,900,370 B1 | | 3/2011 | Treige | |
| 9,335,141 B2 | * | 5/2016 | Phelps | G01B 3/1084 |
| 9,335,142 B2 | * | 5/2016 | DeMartinis | G01B 3/1084 |
| 9,557,151 B1 | * | 1/2017 | Sanchez | G01B 3/1084 |

(Continued)

*Primary Examiner* — Christopher Fulton
(74) *Attorney, Agent, or Firm* — The Keys Law Firm PLLC

(57) ABSTRACT

A tape measure marking attachment for coupling to a tape measure and marking a surface beneath the tape measure at a desired location includes a hinged ring base defining an enclosing structure which can be selectively secured to the tape body of a conventional tape measure, a securing clip operative to fix the ring base in a closed position when in place on a conventional tape measure, and a marking member which extends down from the ring base and provides an integrated marking implement. When the tape measure marking attachment is in place on a conventional tape measure, a user can view the precise distance location through the top side of the ring base and press the tape measure marking attachment against a surface over which the tape measure is suspended to mark the surface at the exact distance measurement shown through the ring base.

4 Claims, 3 Drawing Sheets

(56) References Cited

U.S. PATENT DOCUMENTS

| | | | |
|---|---|---|---|
| 9,658,046 B2* | 5/2017 | Fulton | G01B 3/1084 |
| 2003/0159304 A1* | 8/2003 | Black | B25H 7/04 |
| | | | 33/668 |
| 2015/0075022 A1* | 3/2015 | Bitton | B25H 7/04 |
| | | | 33/760 |

* cited by examiner

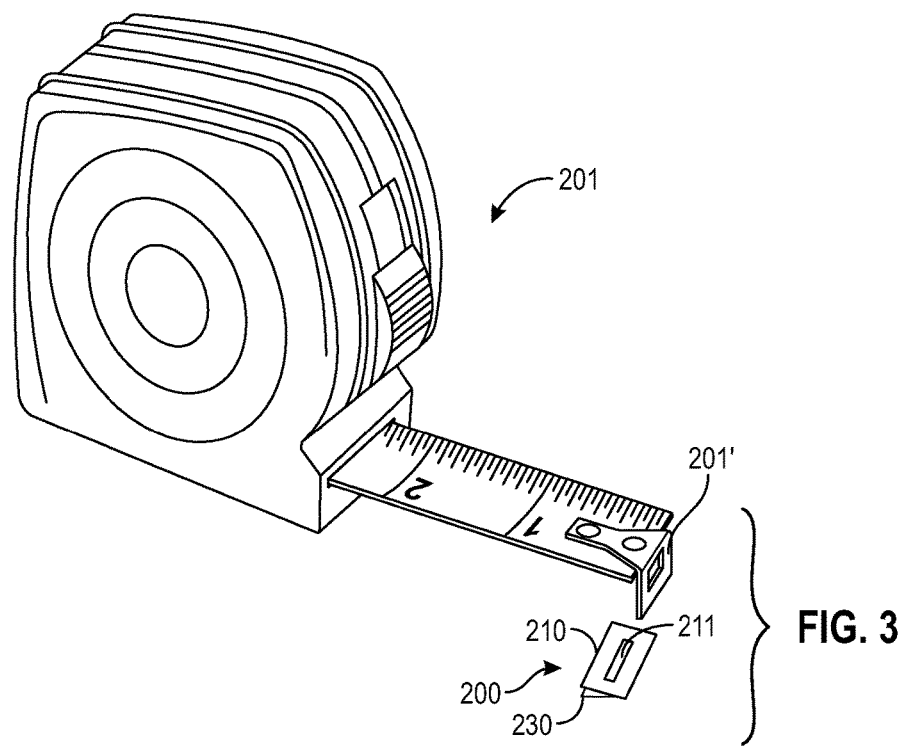
FIG. 3
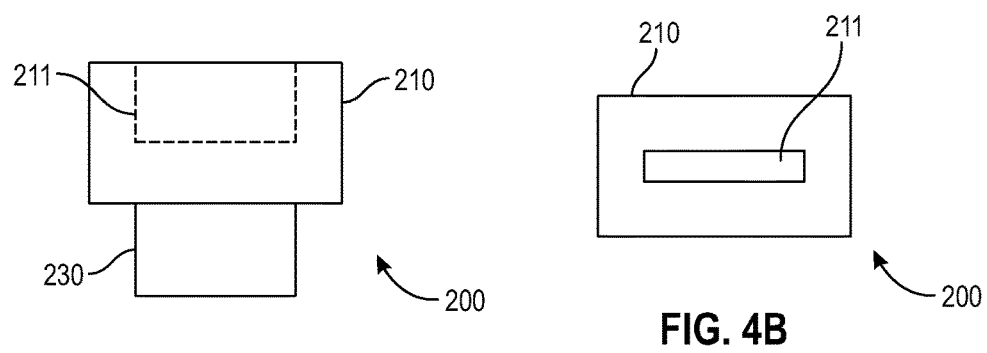
FIG. 4A
FIG. 4B

TAPE MEASURE MARKING ATTACHMENT

CROSS REFERENCE TO RELATED APPLICATIONS

This application claims the benefit of and incorporates by reference U.S. provisional patent application Ser. No. 62/109,563 filed Jan. 29, 2015.

BACKGROUND OF THE INVENTION

Field of the Invention

This invention relates generally to a marking apparatus and, more particularly, to a two piece marking attachment for a tape measure.

Description of the Prior Art

The use and design of a tape measure to make measurements for various purposes is well established. A problem which still exists, however, is that it is often difficult for a single user to both handle a tape measure for making measurements and mark the specific placement of desired measurements. Thus, there remains a need for a tape measure marking attachment that can removably attach to a conventional tape measure and be used to make a marking therefrom. It would be helpful if such a tape measure marking attachment locked onto a tape measure at a desired location to ensure it could make a precise marking at the desired location. It would be additionally desirable for such a tape measure marking attachment to include an integrated marking tip suitable to leave an erasable mark on a surface in a selected location.

The Applicant's invention described herein provides for a tape measure marking attachment adapted to be snapped on a tape measure and mark a surface from its location on the tape measure. The primary components in Applicant's tape measure marking attachment are a hinged ring base, a securing clip, and a marking member. When in operation, the tape measure marking attachment enables the marking of a desired measurement on a surface solely through the tape measure body. As a result, many of the limitations imposed by prior art structures are removed.

SUMMARY OF THE INVENTION

A tape measure marking attachment for coupling to a tape measure and marking a surface beneath the tape measure at a desired location. The tape measure marking attachment comprises a hinged ring base defining an enclosing structure which can be selectively secured to the tape body of a conventional tape measure, a securing clip operative to fix the ring base in a closed position when in place on a conventional tape measure, and a marking member which extends down from the ring base and provides an integrated marking implement. When the tape measure marking attachment is in place on a conventional tape measure, a user can view the precise distance location through the top side of the ring base and press the tape measure marking attachment against a surface over which the tape measure is suspended to mark the surface at the exact distance measurement shown through the ring base.

It is an object of this invention to provide a tape measure marking attachment that can removably attach to a conventional tape measure and be used to make a marking therefrom.

It is another object of this invention to provide a tape measure marking attachment operative to lock onto a tape measure at a desired location to ensure it could make a precise marking at the desired location.

It is yet another object of this invention to provide a tape measure marking attachment which includes an integrated marking tip suitable to leave an erasable mark on a surface in a selected location.

These and other objects will be apparent to one of skill in the art.

BRIEF DESCRIPTION OF THE DRAWINGS

FIG. 3 is an exploded side perspective view of a tape measure marking attachment built in accordance with a second embodiment of the present invention and fitted for a conventional tape measure.

FIG. 4A is a side elevational view of a tape measure marking attachment built in accordance with a second embodiment of the present invention.

FIG. 4B is a top plan view of a tape measure marking attachment built in accordance with a second embodiment of the present invention.

DETAILED DESCRIPTION OF THE INVENTION

Figure 1A:
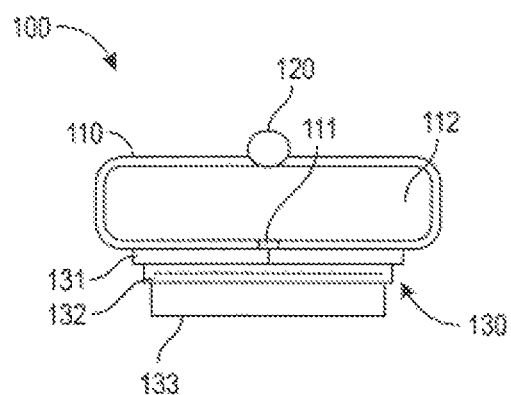
FIG. 1A is a side elevational view of a tape measure marking attachment built in accordance with the present invention in a closed position.
Figure 1B:
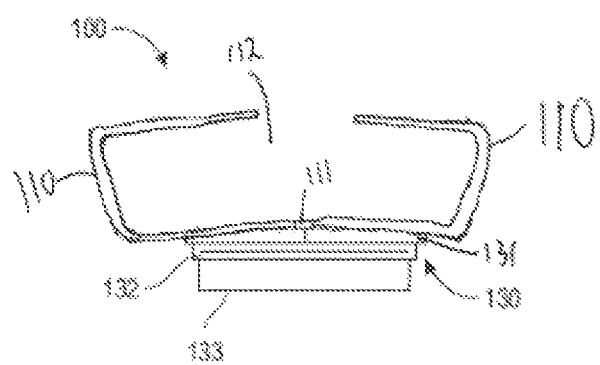
FIG. 1B is a side elevational view of a tape measure marking attachment built in accordance with the present invention in an open position.
Figure 2:
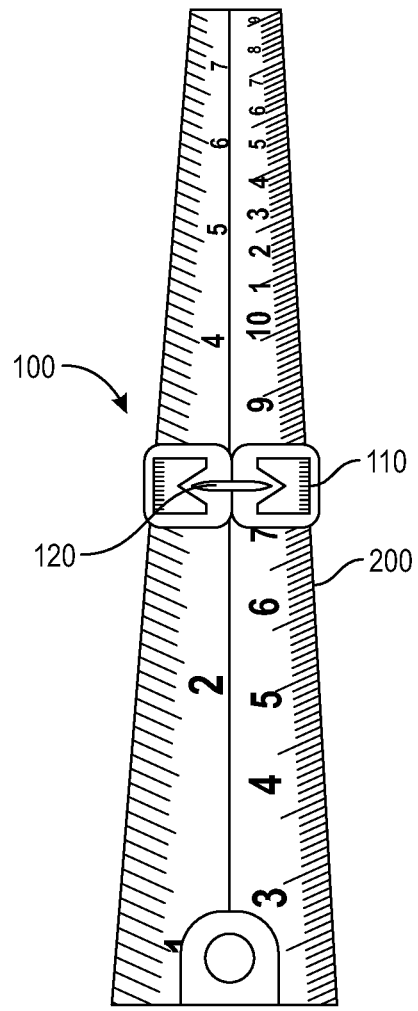
FIG. 2 is a top plan view of a tape measure marking attachment built in accordance with the present invention and disposed in a closed position on a conventional tape measure.

Referring now to the drawings and in particular FIGS. 1A, 1B, and 2, a tape measure marking attachment 100 is shown having a hinged ring base 110, a securing clip 120, and a marking member 130. The ring base 110 is an enclosing structure that includes a hinge member 111 that allows it to swing about the pivot formed by the hinge member 111 between a closed position, as illustrated in FIGS. 1A and 2, and an open position defined by the two sides of the ring base 110 moving away from one another (as illustrated in FIG. 1B. In this regard, the ring base 110 is employed to enable the tape measure marking attachment 100 to be secured to the tape body 200 of a conventional tape measure, with the ring base 110 in its open position being moved over the tape body 200 and swung to its closed position to trap the tape body 200 inside the enclosure area 112 of the ring base. It is contemplated that the two sides at the top of the ring base 110 would only swing open enough to allow the thin side of a tape body 200 to slide through.

The securing clip 120 is removably attachable to the top side of the ring base 110 and is employed to hold the two opposing sides on the top of the ring base 110 together, thereby holding the ring base 110 in the closed position on the tape body 200. In one embodiment, the securing clip 120 is secured to the ring base 110 through an adhesive, and in other embodiment, it is secured thereto through either a magnet or a latch fastener integral with the securing clip 120 and the two sides of the top of the ring base 110.

The marking member 130 defines a deformable channel member 131 and a plastic tip 132 which extends down from the bottom of the ring base 110. Extending from the plastic tip 132 is a marking material, defined in one embodiment as a graphite member 133. When the tape measure marking attachment 100 is in place on a conventional tape measure, as shown in FIG. 2, it is contemplated that a user can view the precise distance location of the tape measure marking attachment 100 through the top side of the ring base 110 and press the tape measure marking attachment 100 against a surface over which the tape measure is suspended, thereby causing the graphite member 133 to mark the surface at the exact distance measurement shown through the ring base 110.

It is contemplated that on some embodiments, the channel member 131 defines an elastic body operative to bias the ring base 110 to remain and/or return to its closed position whenever the ring base 110 is moved to its open position.

Referring now to FIGS. 3, 4A and 4B, an alternate, second embodiment of a tape measure marking attachment 200 is shown having a soft rubber body member 210 and a marking tip 230. The body member 210 includes a slot 211 its top surface that is sized to fit onto the tang or lip 201' of a conventional tape measure 201. Accordingly, when the tape measure marking attachment 200 is to be employed with a conventional tape measure, it is placed on the end of the conventional tape measure 201 by sliding the tang or lip 201' into the slot 211.

The marking member 230 defines a graphite tip in one embodiment, but in other embodiments may define an alternate colored marking material. When in place on a conventional tape measure 201, the marking member 230 allows for the marking of measurements at the location from where the measurement is being taken.

It is contemplated that the second embodiment of the tape measure marking attachment 200 may be employed in conjunction with the preferred embodiment of the tape measure marking attachment shown in FIGS. 1 and 2, with the attachments being positioned at distinct locations on the tape measure to allow for a source marking and a destination marking. Alternatively, the second embodiment may be employed as an alternative to the preferred embodiment as it is contemplated that a user stretching out the tape measure may be able to make by hand destination marking.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A tape measure marking attachment for attaching to an elongated linear measurement apparatus, comprising:
    a ring base having a top and a bottom and formed from two mirror image opposing sides, wherein said opposing sides are connected on the bottom of the ring base by a hinge member which forms a pivot about which the opposing sides of the ring base swing between a closed position in which said opposing sides are touching on the top of the ring base and an open position in which said opposing sides are separated on the top of the ring base, thereby adapting said ring base to removably attach to a elongated linear measurement apparatus;
    said top of said ring base configured such that when the ring base is attached to said elongated linear measurement apparatus, measurement markings on said elongated linear measurement apparatus are visible through the top of said ring base; and
    a marking member having a base side integral with the bottom of the ring base and a marking portion opposite said base side, wherein said marking portion is adapted to apply a pigment material to a surface on contact.

2. The tape measure marking attachment of claim 1, additionally comprising a securing clip selectively attachable to said ring base when said opposing sides are touching on the top of the ring base and operative to fix said ring base in said closed position.

3. The tape measure marking attachment of claim 1, wherein said base side of said marking member includes a deformable channel member operative to bias said ring base into its closed position whenever said ring base is moved to its open position.

4. A tape measure marking attachment for attaching to an elongated linear measurement apparatus, comprising:
    a ring base having a top and a bottom and formed from two mirror image opposing sides, wherein said opposing sides are connected on the bottom of the ring base by a hinge member which forms a pivot pivot about which the opposing sides of the ring base swing between a closed position in which said opposing sides are touching on the top of the ring base and an open position in which said opposing sides are separated on the top of the ring base, thereby adapting the ring base to removably attach to an elongated linear measurement apparatus;
    said top of said ring base configured such that when the ring base is attached to said elongated linear measurement apparatus, measurement markings on said elongated linear measurement apparatus are visible through the top;
    a securing clip selectively attachable to said ring base when said opposing sides are touching on the top of the ring base and operative to fix said ring base in said closed position;
    a marking member having a base side integral with the bottom of the ring base and a marking portion opposite said base side, wherein said marking portion is adapted to apply a pigment material to a surface on contact; and
    said base side of said marking member including a deformable channel member operative to bias said ring base into its closed position whenever said ring base is moved to its open position.

* * * * *